United States Patent
Ye et al.

(10) Patent No.: US 11,692,885 B2
(45) Date of Patent: Jul. 4, 2023

(54) METHOD FOR IDENTIFYING SPATIAL-TEMPORAL DISTRIBUTION OF VEHICLE LOADS ON BRIDGE BASED ON DENSELY CONNECTED CONVOLUTIONAL NETWORKS

(71) Applicant: Zhejiang University, Zhejiang (CN)

(72) Inventors: Xiaowei Ye, Zhejiang (CN); Zhexun Li, Zhejiang (CN); Tao Jin, Zhejiang (CN)

(73) Assignee: Zhejiang University, Hangzhou (CN)

( * ) Notice: Subject to any disclaimer, the term of this patent is extended or adjusted under 35 U.S.C. 154(b) by 425 days.

(21) Appl. No.: 17/012,034

(22) Filed: Sep. 3, 2020

(65) Prior Publication Data

US 2021/0381911 A1    Dec. 9, 2021

(30) Foreign Application Priority Data

Jun. 4, 2020   (CN) .......................... 202010498366.1

(51) Int. Cl.
| | |
|---|---|
| *G01L 1/00* | (2006.01) |
| *G06T 7/00* | (2017.01) |
| *G06T 7/246* | (2017.01) |
| *G06N 3/04* | (2023.01) |
| *G06N 3/045* | (2023.01) |

(52) U.S. Cl.
CPC ................ *G01L 1/00* (2013.01); *G06N 3/045* (2023.01); *G06T 7/0002* (2013.01); *G06T 7/246* (2017.01); *G06T 2207/30184* (2013.01)

(58) Field of Classification Search
CPC ......... G01L 1/00; G06T 7/246; G06T 7/0002; G06T 2207/30184; G06N 3/045; G01G 19/03; G06V 2201/08

USPC ........................................................... 702/41
See application file for complete search history.

(56) References Cited

U.S. PATENT DOCUMENTS

| | | | | |
|---|---|---|---|---|
| 2008/0056589 A1* | 3/2008 | Lee | ....................... | G06V 20/695 |
| | | | | 382/236 |
| 2018/0299559 A1* | 10/2018 | Zhao | ....................... | G01S 19/13 |

FOREIGN PATENT DOCUMENTS

| | | |
|---|---|---|
| CN | 109064495 A | 12/2018 |
| CN | 110379168 A | 10/2019 |

(Continued)

OTHER PUBLICATIONS

English translation of CN111602029. Aug. 2020. (Year: 2020).*

*Primary Examiner* — Michael P Nghiem

(57) ABSTRACT

The present invention proposes a method for identifying the spatial-temporal distribution of the vehicle loads on a bridge based on the DenseNet. The method includes five steps: firstly, mounting a plurality of cameras in different positions of a bridge, acquiring images of the bridge from different directions, and outputting video images with time tags; secondly, acquiring multichannel characteristics of vehicles on the bridge by using DenseNet, including color characteristics, shape characteristics and position characteristics; thirdly, analyzing the data and characteristics of the vehicles from different cameras at a same moment to obtain vehicle distribution on the bridge at any time; fourthly, continuously monitoring the vehicle distribution in a time period to obtain a vehicle load situation on any section of the bridge; and finally, integrating the time and space distribution of the vehicles to obtain spatial-temporal distribution of the bridge.

1 Claim, 3 Drawing Sheets

(56) References Cited

FOREIGN PATENT DOCUMENTS

CN 111602029 * 8/2020
WO 2018149302 A1 8/2018

* cited by examiner

METHOD FOR IDENTIFYING SPATIAL-TEMPORAL DISTRIBUTION OF VEHICLE LOADS ON BRIDGE BASED ON DENSELY CONNECTED CONVOLUTIONAL NETWORKS

CROSS-REFERENCE TO RELATED APPLICATIONS

This application claims the benefit of priority from Chinese Patent Application No. 202010498366.1, filed on Jun. 4, 2020. The content of the aforementioned application, including any intervening amendments thereto, is incorporated herein by reference in its entirety.

TECHNICAL FIELD

The present invention relates to a method for identifying spatial-temporal distribution of vehicle loads on a bridge based on a densely connected convolutional network.

BACKGROUND OF THE PRESENT INVENTION

During the service period, bridge structures bear random loads such as wind load, vehicle load, crowd load, earthquake load and the like for a long time, thereby causing fatigue phenomenon. Although stress levels caused by the repeated fatigue loads are far lower than the yield strength of beams, the strong stress concentration phenomenon may occur, finally resulting in sudden damage which is called fatigue damage. The fatigue damage is brittle damage of structural materials under the repeated loads, which are lower than the static load strength.

Among the above acting forces, the vehicle load is the most important factor. Because of the large acting force, high frequency and long acting time, the resulting fatigue damage of the bridge structure is maximal. Due to the long-term load of various actual vehicles, the fatigue damage of bridge structural members is accumulated day by day.

Therefore, investigation of the fatigue of the bridge structure requires the study of the vehicle load in advance. However, it is impossible to calculate all vehicles actually passing through the bridge in a designed reference period, so a certain statistics method is required to determine the fatigue load for fatigue design. The vehicle loads on the bridge structure are sampled and listed according to the size and occurrence frequency to obtain a vehicle load spectrum.

The following methods are generally used to acquire the vehicle load spectrum of the bridge:

The first method is to configure a weighing station to collect axle weights and total weights of the passing vehicles, record vehicle information, and find out geometric dimensions of the vehicles through automobile manufacturers. This method can completely record the specific information of the vehicles passing through the bridge, but has great influence on the traffic, low efficiency and difficulty in locating the weighing station.

Another method is based on weigh-in-motion system. This system includes a group of installed sensors and electronic instruments with software and is used to measure a dynamic tire force and vehicle passing time and to provide data for calculating tire weights, axle weights, total weights and other data such as vehicle speed and axle bases. Since the actual traffic data can be correctly acquired through this method, the vehicle load effect can be calculated through the data, and then the extreme value theory is used to predict the future load effect. However, this method has a serious defect. When this method is used to identify the vehicles of the bridge, generally the weighing station can only be mounted at a bridge abutment or an approach bridge, so that the vehicle load and the vehicle distribution within a bridge span cannot be identified.

SUMMARY OF THE PRESENT INVENTION

To overcome the above defect of the prior art, the present invention provides a method for identifying spatial-temporal distribution of vehicle loads on a bridge based on a densely connected convolutional network called DenseNet.

The present invention proposes a method for identifying the spatial-temporal distribution of the vehicle loads on a bridge based on the DenseNet. The method includes five steps: firstly, mounting a plurality of cameras in different positions of a bridge, acquiring images of the bridge from different directions, and outputting video images with time tags; secondly, acquiring multichannel characteristics of vehicles on the bridge by using DenseNet, including color characteristics, shape characteristics and position characteristics; thirdly, analyzing the data and characteristics of the vehicles from different cameras at a same moment to obtain vehicle distribution on the bridge at any time; fourthly, continuously monitoring the vehicle distribution in a time period to obtain a vehicle load situation on any section of the bridge; and finally, integrating the time and space distribution of the vehicles to obtain spatial-temporal distribution of the bridge.

The method for identifying the spatial-temporal distribution of vehicle loads on a bridge based on the DenseNet includes the following steps:

A. Mounting the cameras;

A1. Selecting a to-be-monitored bridge, determining a start position and an end position of the bridge, establishing a coordinate system by adopting a span direction as an axle x, a bridge width direction as an axle y and the center of the start position as an origin, and quantifying the position information on the bridge;

A2. Mounting the cameras on the bridge according to objective conditions of the bridge such as length, width and upper structures to monitor the bridge;

A3. Acquiring real-time monitoring images of the bridge by using the cameras, intercepting a first frame of images, and marking time for the subsequent monitoring images by using the time as a base point;

A4. Processing the images acquired in step A3, and calculating a conversion equation between the images and actual positions according to a correspondence between the images monitored by each camera and the actual positions.

B. Identifying vehicles by using DenseNet;

B1. Collecting different types of vehicles from different directions by using the cameras, and classifying and marking characteristics of the vehicles such as shapes, colors and positions to obtain a vehicle database;

B2. Training the DenseNet based on the database in step B1; the neural network is trained by stochastic gradient descent (SGD) method to update the weights of the network, and it is used to fit the information of the vehicles on each image; distinguishing the shapes, colors and positions of the vehicles by using the neural network, and outputting the data capable of representing the characteristics;

B3. Identifying the monitoring images acquired by the cameras by using the trained DenseNet.

C. Acquiring a vehicle distribution at a moment;

C1. Collecting the monitoring images of all the cameras at a moment, and transmitting the monitoring images to a computer;

C2. Analyzing the monitoring images by using the DenseNet trained in step B2 to obtain the characteristics of the vehicles such as shapes, colors and positions on the monitoring images captured by each camera, and calculating the actual position of the vehicle on the bridge at the moment according to a conversion relation between the position on the image determined in A4 and the actual position;

C3. Evaluating the above data by using a Bayesian method; obtaining similarity of the vehicle characteristics in different images by using a log-likelihood ratio through an expectation maximization algorithm; and finally identifying different images of the same vehicle;

C4. Combining the position information identified as the same vehicle, and calculating an average value of final position results of the vehicles by using a plurality of camera images to obtain the vehicle distribution on the bridge at the moment.

D. Acquiring the vehicle distribution on any section of the bridge;

D1. In a period of time, repeating the step C at a specific interval to obtain the vehicle distribution of the bridge at the moment;

D2. Evaluating the data of the images captured at adjacent moments by using the method of C3, and identifying the images of the same vehicle at different moments and the positions of the vehicle at the start moment and end moment of the time period;

D3. Continuously monitoring the bridge to obtain a complete running situation of any vehicle on the bridge from entering the bridge range to leaving the bridge range, and extracting the time when the vehicle passes through a target section;

D4. Integrating the characteristics of the vehicles passing through the target section and the time when the vehicles pass through the section in D3 to obtain the distribution of the vehicles on the section over time.

E. Acquiring spatial-temporal distribution information of the vehicles on the bridge;

E1. Establishing a spatial-temporal distribution map of the vehicles on the bridge according to the distribution of the vehicles on the bridge at one moment and the distribution of the vehicles on the specific section at different moments.

Compared with the prior art, the present invention has the following advantages:

1. By using a plurality of cameras to identify the target together, the results are accurate, and the interference caused by a blocked camera can be reduced.

2. The distribution and running locus of the vehicles can be automatically identified, which is conducive to the subsequent estimation of traffic volumes and loads of the bridge.

3. The vehicles are identified by using the computers, so that the manpower cost can be reduced, and the long-term and continuous monitoring can be realized.

4. The existing cameras can be used for monitoring, so that the construction cost can be reduced.

5. The maintenance and replacement of the cameras are simple and will not affect the bridge structure.

6. The method can be combined with the weigh-in-motion method. The specific vehicle load on the bridge obtained by the weigh-in-motion method can be combined with the spatial-temporal distribution of the vehicles in the method of the present invention to obtain the vehicle load spectrum of the bridge.

DESCRIPTION OF NUMERALS IN THE DRAWINGS

Figure 1:
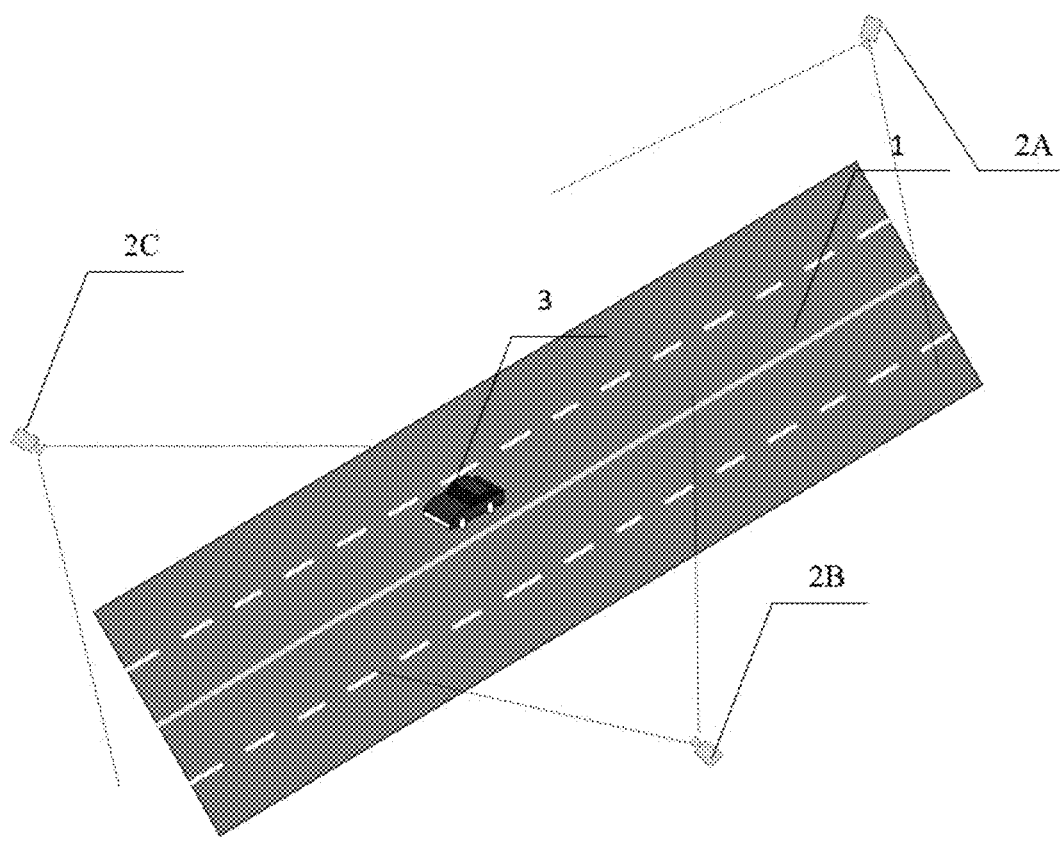
FIG. 1 is a monitoring schematic diagram of vehicle positions of the present invention.
Figure 2:
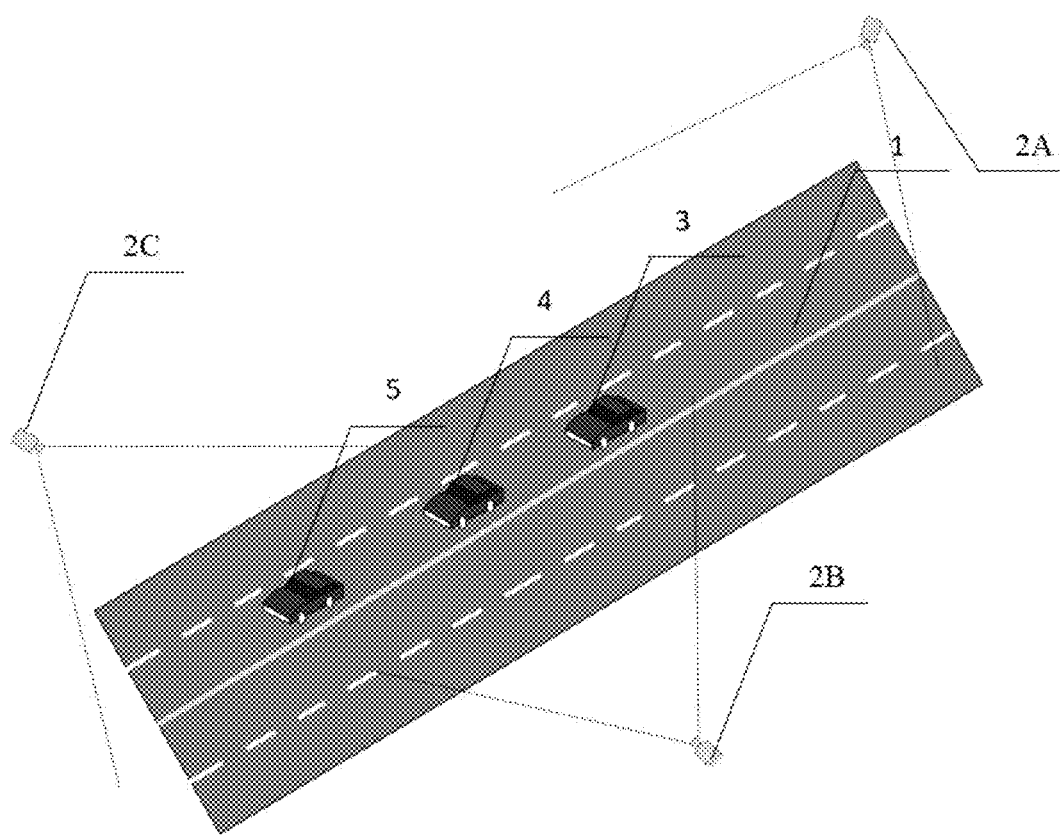
FIG. 2 is a tracking schematic diagram of vehicle positions of the present invention.
Figure 3:
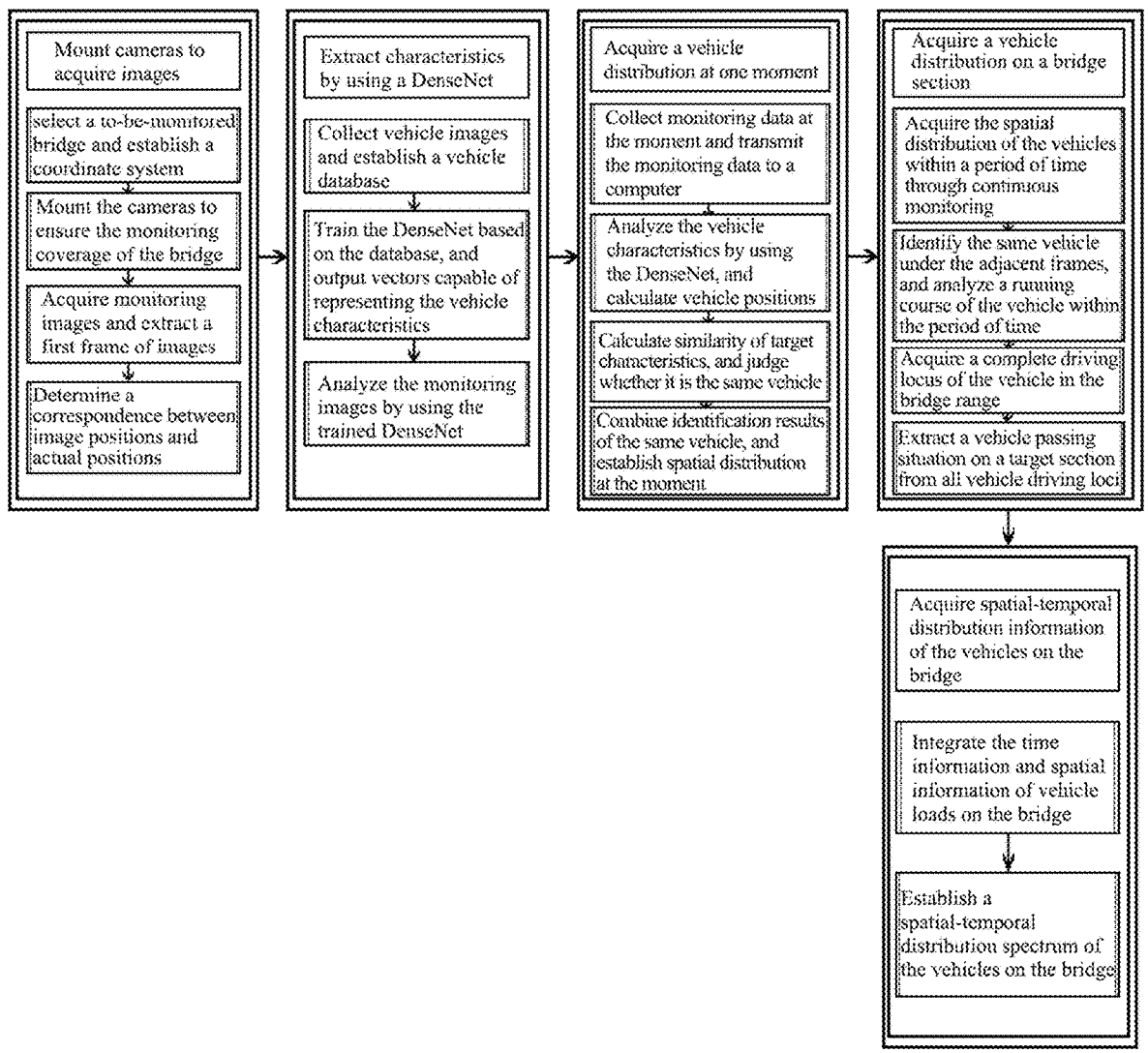
FIG. 3 is an implementation flow chart of the present invention.

1—to-be-monitored bridge;
2—cameras A, B and C;
3—image frame of the vehicle taken by the camera at $t_1$ moment,
4—image frame of the vehicle taken by the camera at $t_2$ moment;
5—image frame of the vehicle taken by the camera at $t_3$ moment.

DETAILED DESCRIPTION OF THE PRESENT INVENTION

Specific embodiments of the present invention are further described below in combination with the accompanying drawings.

A method for identifying spatial-temporal distribution of vehicle loads on a bridge based on a DenseNet includes the following steps:

A. Mounting the cameras;

A1. Selecting a to-be-monitored bridge, determining a start position and an end position of the bridge 1, establishing a coordinate system by adopting a span direction as an axle x, a bridge width direction as an axle y and the center of the start position as an origin, and quantifying the position information on the bridge;

A2. Mounting the cameras 2 on the bridge according to objective conditions of the bridge such as length, width and upper structures to monitor the bridge;

A3. Acquiring real-time monitoring images of the bridge by using the cameras, intercepting a first frame of images, and marking time for the subsequent monitoring images by using the time as a base point;

A4. Processing the images acquired in step A3, and calculating a conversion equation between the images and actual positions according to a correspondence between the images monitored by each camera and the actual positions.

B. Identifying vehicles by using DenseNet;

B1. Collecting different types of vehicles from different directions by using the cameras, and classifying and marking characteristics of the vehicles such as shapes, colors and positions to obtain a vehicle database;

B2. Training the DenseNet based on the database in step B1; the neural network is trained by stochastic gradient descent (SGD) method to update the weights of the network, and it is used to fit the information of the vehicles on each image; distinguishing the shapes, colors and positions of the vehicles by using the neural network, and outputting the data capable of representing the characteristics;

B3. Identifying the monitoring images acquired by the cameras by using the trained DenseNet.

C. Acquiring a vehicle distribution at a moment;

C1. Collecting the monitoring images of all the cameras at a moment, and transmitting the monitoring images to a computer;

C2. Analyzing the monitoring images by using the neural network trained in step B2 to obtain the characteristics of the vehicles such as shapes, colors and positions on the monitoring images captured by each camera, and calculating the actual position of the vehicle on the bridge at the moment according to a conversion relation between the position on the image determined in A4 and the actual position;

C3. Evaluating the above data by using a Bayesian method; obtaining similarity of the vehicle characteristics in different images by using a log-likelihood ratio through an expectation maximization algorithm; and finally identifying different images of the same vehicle;

C4. Combining the position information identified as the same vehicle, and calculating an average value of final position results of the vehicles by using a plurality of camera images to obtain the vehicle distribution on the bridge at the moment.

D. Acquiring the vehicle distribution on any section of the bridge;

D1. In a period of time, repeating the step C at a specific interval to obtain the vehicle distribution of the bridge at the moment;

D2. Evaluating the data of the images captured at adjacent moments by using the method of C3, and identifying the images 3, 4 and 5 of the same vehicle at different moments and the positions of the vehicle at the start moment and end moment of the time period;

D3. Continuously monitoring the bridge to obtain a complete running situation of any vehicle on the bridge from entering the bridge range to leaving the bridge range, and extracting the time when the vehicle passes through a target section;

D4. Integrating the characteristics of the vehicles passing through the target section and the time when the vehicles pass through the section in D3 to obtain the distribution of the vehicles on the section over time.

E. Acquiring spatial-temporal distribution information of the vehicles on the bridge;

E1. Establishing a spatial-temporal distribution map of the vehicles on the bridge according to the distribution of the vehicles on the bridge at one moment and the distribution of the vehicles on the specific section at different moments.

We claim:

1. A method for identifying spatial-temporal distribution of vehicle loads on a to-be-monitored bridge based on a densely connected convolutional network DenseNet, comprising the following steps:

A. mounting cameras;

A1. selecting the to-be-monitored bridge, determining a start position and an end position of the bridge, selecting a plurality of references between the start position and the end position of the bridge, establishing a coordinate system by adopting a span direction as an axle x, a bridge width direction as an axle y and the start position as an origin, and quantifying position information on the bridge;

A2. mounting the cameras on the bridge to monitor the bridge;

A3. acquiring real-time monitoring images of the bridge by using the cameras, intercepting a first frame of images, and marking time for the subsequent monitoring images by using time of the first frame of the images as a base point; and A4. analyzing the references on the images acquired in step A3 to determine actual positions of the references on the bridge;

B. identifying vehicles by using the DenseNet;

B1. collecting different types of vehicles from different directions by using the cameras, and classifying and marking characteristics of the vehicles such as shapes, colors and positions to obtain a vehicle database;

B2. training the DenseNet based on the vehicle database in step B1; wherein the DenseNet is trained by a stochastic gradient descent (SGD) method to update weights of the DenseNet, to fit the characteristics of the vehicles on each image; distinguishing the shapes, colors and positions of the vehicles by using the DenseNet, and outputting data capable of representing the characteristics; and B3. identifying the monitoring images acquired by the cameras by using the trained DenseNet;

C. acquiring a vehicle distribution at a moment;

C1. transmitting the monitoring images at the moment to a computer;

C2. analyzing the monitoring images by using the DenseNet trained in step B2, and determining actual positions of the vehicles on the bridge at the moment;

C3. evaluating the characteristics and the actual positions of the vehicles on the bridge at the moment by using a Bayesian method; obtaining similarity of the characteristics in different images by using a log-likelihood ratio through an expectation maximization algorithm; and finally identifying different images of one vehicle in the vehicles on the bridge at the moment; and C4. combining position information identified as of the one vehicle in the vehicles on the bridge at the moment, and calculating an average value of final position results of the one vehicle in the vehicles on the bridge at the moment by using the monitoring images monitored by a plurality of the cameras to obtain the vehicle distribution on the bridge at the moment;

D. acquiring the vehicle distribution on any section of the bridge;

D1. In a period of time, repeating the step C at a specific interval to obtain the vehicle distribution of the bridge at the specific interval;

D2. evaluating data of the images captured at adjacent moments by using the method of C3, and identifying the images of the one vehicle in the vehicles at different moments and positions of the one vehicle at a start moment and an end moment of the time period;

D3. continuously monitoring the bridge to obtain a complete running situation of any vehicle on the bridge from entering a bridge range to leaving the bridge range, and extracting time when any vehicle passes through a target section of the bridge range; and D4. integrating the characteristics of the vehicles passing through the target section and time when the vehicles pass through the target section in D3 to obtain the vehicle distribution on the target section over time; and E. acquiring spatial-temporal distribution information of the vehicles on the bridge based on the extracted time and the target section;

E1. establishing a spatial-temporal distribution map of the vehicles on the bridge based on the acquired spatial-temporal distribution information and according to the vehicle distribution on the bridge at one moment and the vehicle distribution on one specific section at different moments.

* * * * *